United States Patent
Belsarkar et al.

(10) Patent No.: US 12,418,631 B2
(45) Date of Patent: Sep. 16, 2025

(54) CONFIGURABLE AUDIO AND VIDEO SECTORS

(71) Applicant: Robert Bosch GmbH, Stuttgart (DE)

(72) Inventors: Ajit Belsarkar, Lancaster, PA (US); Jacob A. Gallucci, Mechanicsburg, PA (US)

(73) Assignee: Robert Bosch GmbH, Stuttgart (DE)

( * ) Notice: Subject to any disclaimer, the term of this patent is extended or adjusted under 35 U.S.C. 154(b) by 266 days.

(21) Appl. No.: 18/054,012

(22) Filed: Nov. 9, 2022

(65) Prior Publication Data

US 2024/0155079 A1    May 9, 2024

(51) Int. Cl.
| | |
|---|---|
| H04N 7/18 | (2006.01) |
| G06F 3/16 | (2006.01) |
| G08B 13/196 | (2006.01) |
| H04N 23/62 | (2023.01) |
| H04N 23/63 | (2023.01) |
| H04N 23/695 | (2023.01) |

(52) U.S. Cl.
CPC ............ *H04N 7/181* (2013.01); *G06F 3/16* (2013.01); *H04N 23/62* (2023.01); *G08B 13/19697* (2013.01); *H04N 23/631* (2023.01); *H04N 23/635* (2023.01); *H04N 23/695* (2023.01)

(58) Field of Classification Search
CPC ...... H04N 7/181; H04N 23/62; H04N 23/635; H04N 23/695; H04N 23/631; G06F 3/16; G08B 13/19697
USPC ....................................................... 381/122
See application file for complete search history.

(56) References Cited

U.S. PATENT DOCUMENTS

| | | | |
|---|---|---|---|
| 9,396,632 B2 | 7/2016 | Brav et al. | |
| 10,235,573 B2 | 3/2019 | Pellom et al. | |
| 11,232,688 B1 | 1/2022 | Lemberger et al. | |
| 2005/0018049 A1* | 1/2005 | Falk | H04N 7/181 |
| | | | 348/E7.086 |
| 2007/0009104 A1* | 1/2007 | Renkis | G08B 13/19673 |
| | | | 380/270 |
| 2014/0006017 A1 | 1/2014 | Sen | |
| 2016/0241818 A1 | 8/2016 | Palanisamy et al. | |
| 2018/0322751 A1 | 11/2018 | Sacre et al. | |
| 2019/0043525 A1 | 2/2019 | Huang et al. | |

(Continued)

OTHER PUBLICATIONS

International Search Report for Application No. PCT/EP2023/079985 dated Feb. 27, 2024 (4 pages).

*Primary Examiner* — Vivian C Chin
*Assistant Examiner* — Douglas J Suthers
(74) *Attorney, Agent, or Firm* — Michael Best & Friedrich LLP (57) ABSTRACT

Systems and methods for configuring audio and video sectors of a camera. An audio analytics system includes a first computer configured to receive information from a camera and a microphone. The first computer includes an electronic processor. The electronic processor receives data including an image of a location and an audio of the location and generates a view of the location. The electronic processor sets, in response to receiving a first user input, a first sector of the view of the location, and sets, in response to receiving a second user input, a second sector of the view of the location. The electronic processor adjusts, in response to receiving a third user input, a configuration of the first sector, and adjusts, in response to receiving a fourth user input, a configuration of the second sector.

16 Claims, 7 Drawing Sheets

(56) References Cited

U.S. PATENT DOCUMENTS

| | | | |
|---|---|---|---|
| 2019/0139381 A1* | 5/2019 | Harpole | ................ H04N 7/183 |
| 2019/0147175 A1 | 5/2019 | Varerkar et al. | |
| 2021/0368137 A1* | 11/2021 | Alcantara | .............. G06V 20/35 |

\* cited by examiner

CONFIGURABLE AUDIO AND VIDEO SECTORS

FIELD

Embodiments, examples, and aspects relate to, among other things, systems and methods for configuring audio and video sectors of a camera.

SUMMARY

Monitoring systems often use a combination of cameras and microphones to monitor a location. An operator of the monitoring system may want to monitor and configure multiple viewpoints of the cameras independently, rather than setting a configuration of the entire viewpoint of each camera. For example, on a moving camera, the operator may configure one position or viewpoint to be sensitive to motion and mask off an area. Another position or viewpoint is configured to run an object detection algorithm. Yet another position or viewpoint is configured for low lighting scenarios. When an operator does not wish to capture conversations or sensitive audio in a given sector, audio recording may be disabled, or noise may be input into the audio for the specified sector Examples, instances, and aspects described herein provide, among other things, for a means to allow a user to monitor and configure viewpoints around a monitoring device independently. Both video and audio analytics are independently configured for each viewpoint or sector within the camera view.

One example provides an audio analytics system having a first computer configured to receive information from a camera and a microphone. The first computer includes an electronic processor. The electronic processor is configured to receive data including an image of a location and an audio of the location and generate a view of the location based on the received data. The electronic processor is configured to set a first sector of the view of the location in response to receiving a first user input, and set, a second sector of the view of the location in response to receiving a second user input. The electronic processor is configured to adjust a configuration of the first sector, in response to receiving a third user input, and adjust, a configuration of the second sector in response to receiving a fourth user input. The configuration of the second sector is different than the configuration of the first sector.

Another example provides a method for controlling an audio analytics system. The method includes receiving, via an electronic processor, data including an image of a location from a camera and an audio of the location from a microphone, and generating, via the electronic processor and on a display, a view of the location based on the received data. The method includes setting, via the electronic processor and in response to receiving a first user input, a first sector of the view of the location, and setting, via the electronic processor and in response to receiving a second user input, a second sector of the view of the location. The method includes adjusting, via the electronic processor and in response to receiving a third user input, a configuration of the first sector, and adjusting, via the electronic processor and in response to receiving a fourth user input, a configuration of the second sector. The configuration of the second sector is different than the configuration of the first sector.

Other features, aspects, and benefits of various embodiments will become apparent by consideration of the detailed description and accompanying drawings.

DETAILED DESCRIPTION

One or more examples are described and illustrated in the following description and accompanying drawings. These examples are not limited to the specific details provided herein and may be modified in various ways. Other examples may exist that are not described herein. For example, a device or structure that is "configured" in a certain way is configured in at least that way but may also be configured in ways that are not listed.

It should also be noted that a plurality of hardware and software based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the aspects may be implemented in software (for example, stored on non-transitory computer-readable medium) executable by one or more processors. Thus, a plurality of hardware and software based devices, as well as a plurality of different structural components may be utilized to implement various aspects and examples. For example, "control units" and "controllers" described in the specification can include one or more electronic processors, one or more memory modules including a non-transitory computer-readable medium, one or more input/output interfaces, and various connections (for example, a system bus) connecting the components. It should be understood that although certain drawings illustrate hardware and software located within particular devices, these depictions are for illustrative purposes only. Unless the context clearly indicates otherwise, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Examples described herein may be implemented as non-transitory, computer-readable medium storing instructions executable by one or more electronic processors to perform the described functionality. As used in the present application, "non-transitory computer-readable medium" comprises all computer-readable media but does not include a transitory, propagating signal. Accordingly, non-transitory computer-readable medium may include, for example, a hard disk, a CD-ROM, an optical storage device, a magnetic storage device, ROM (Read Only Memory), RAM (Random Access Memory), register memory, a processor cache, other memory and storage devices, or combinations thereof.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections.

Unless the context of their usage unambiguously indicates otherwise, the articles "a" and "an" should not be interpreted as meaning "one" or "only one." Rather these articles should be interpreted as meaning "at least one" or "one or more."

Relational terms, for example, first and second, top and bottom, and the like may be used herein solely to distinguish one entity or action from another entity or action without necessarily requiring or implying any actual such relationship or order between such entities or actions.

In some examples, method steps are conducted in an order that is different from the order described.

Figure 1:
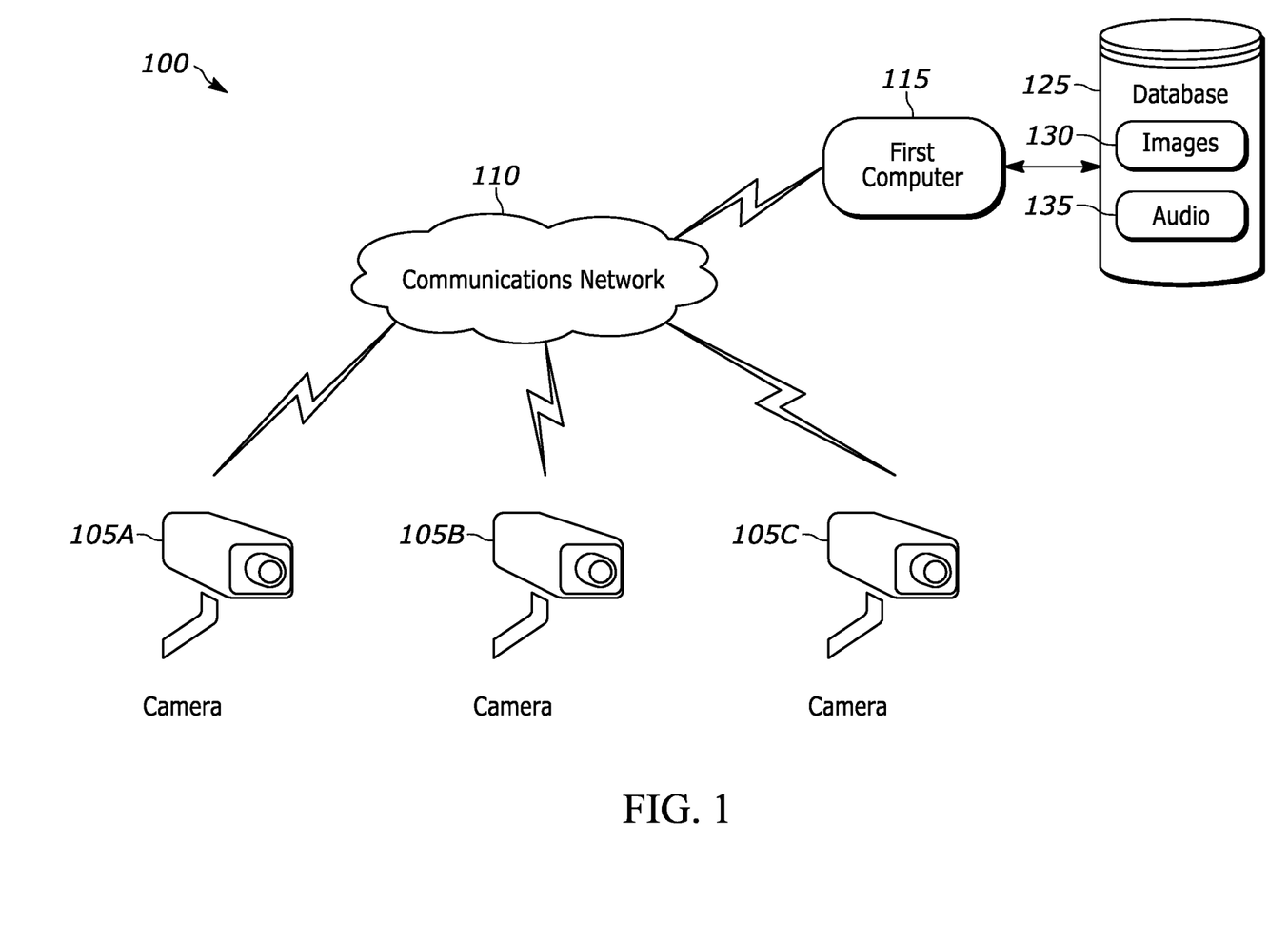
FIG. 1 is a block diagram of an analytics system for configuring sectors of a camera according to one example.

FIG. 1 illustrates an analytics system 100 for monitoring a location. In the example illustrated, the analytics system 100 includes a plurality of cameras (such as a first camera 105A, a second camera 105B, and a third camera 105C), a communications network 110, a first computer 115, and a database 125. In the following description, when explaining how a single camera functions, a reference to camera 105 is used. It is not necessary that the cameras 105A through 105C be identical. Additionally, in some examples, the analytics system 100 includes more or fewer cameras than the number shown in FIG. 1.

The cameras 105A through 105C communicate with the first computer 115 over the communications network 110. The communications network 110 may be wired, wireless, or a combination thereof. All or parts of the communications network 110 may be implemented using various existing networks, for example, a cellular network, a Long Term Evolution (LTE) network, a 5G network, the Internet, network, a Bluetooth™ network, a wireless local area network (for example, Wi-Fi), a wireless a public switched telephone network, or other suitable networks. The communications network 110 may also include future developed networks. Also, in some embodiments, the communications network 110 includes a combination of networks. For example, the first camera 105A may communicate over a LTE network, while the second camera 105B may communicate over Wi-Fi.

The first computer 115 is communicatively connected to the database 125. In some examples the database 125 includes a memory (for example, a non-transitory, computer-readable medium) capable of storing images 130 and audio 135 received from the cameras 105A through 105C via the first computer 115. In some examples, the first computer 115 includes a display and a user interface capable of receiving a plurality of user inputs.

Figure 2:
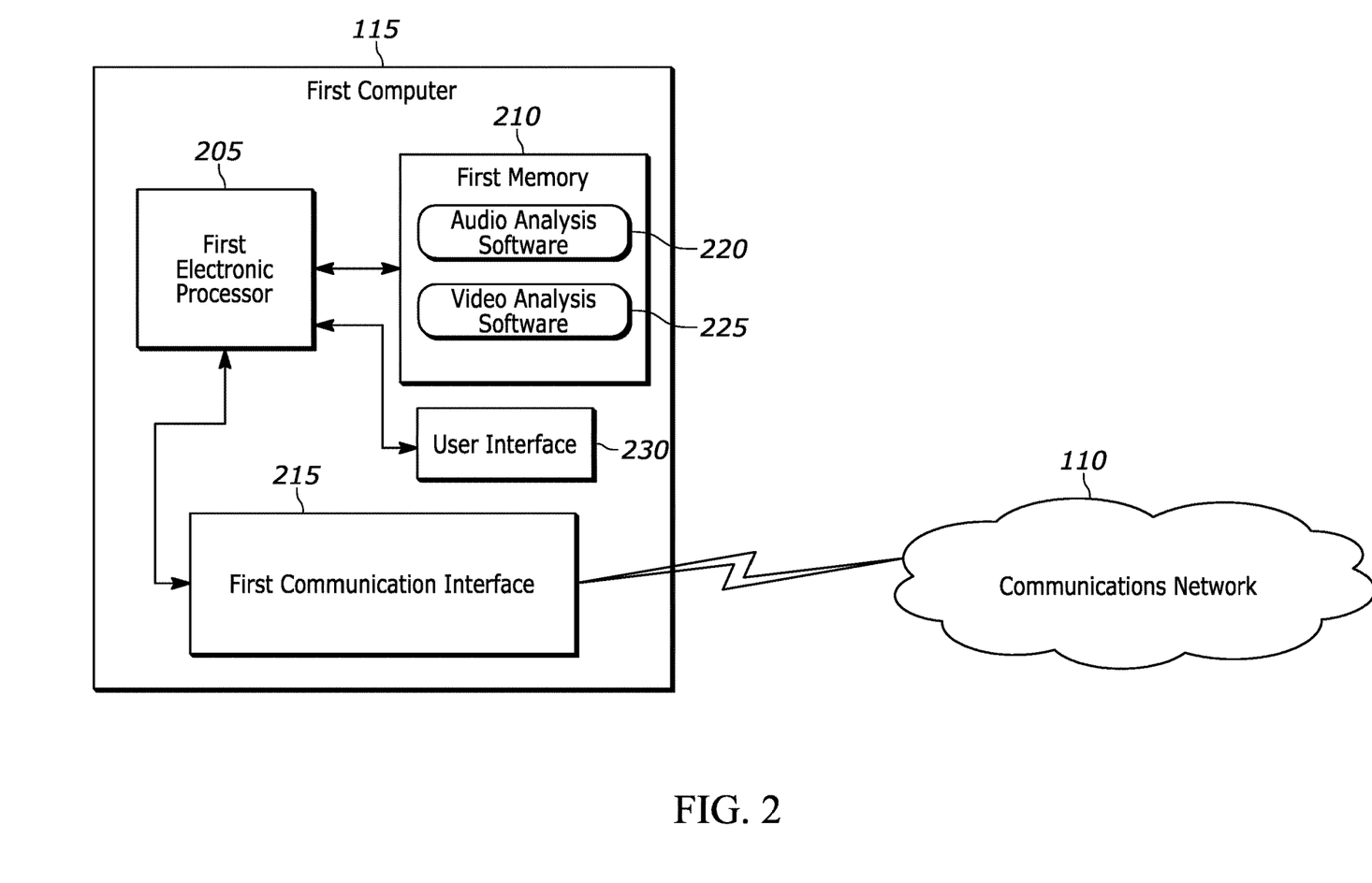
FIG. 2 is a block diagram of a first computer of the analytics system of FIG. 1 according to one example.

FIG. 2 is a block diagram of an example first computer 115. The first computer 115 includes, among other things, a first electronic processor 205 (such as a programmable electronic microprocessor, microcontroller, or similar device), a first memory 210 (for example, a non-transitory, computer-readable medium), a first communication interface 215, and a user interface 230. In some instances, the first computer 115 also includes a plurality of electrical and electronic components that provide power, operational control, and protection to the components and modules within the first computer 115. The first electronic processor 205, the first memory 210, the first communication interface 215, and the user interface 230, as well as the other various modules are connected by one or more control or data buses.

The first electronic processor 205 obtains and provides information (for example, from the first memory 210 and the first communication interface 215), and processes the information by executing one or more software instructions or modules capable of being stored, for example, in the first memory 210). The software can include firmware, one or more applications, program data, filters, rules, one or more program modules, and other executable instructions. In some instances, the first electronic processor 205 executes instructions stored in the first memory 210 to perform the methods described herein. The first memory 210 can include one or more non-transitory computer-readable media and includes a program storage area and a data storage area. The program storage area and the data storage area can include combinations of different types of memory, for example, read-only memory ("ROM"), random access memory ("RAM"), electrically erasable programmable read-only memory ("EEPROM"), flash memory, or other suitable digital memory devices.

In some examples, the first memory 210 stores an audio analysis software 220 and a video analysis software 225. The audio analysis software 220 is implemented by the first electronic processor 205 to analyze audio (for example, audio captured by a microphone included in the cameras 105A through 105C or an external device separate from the cameras 105A through 105C) and, among other things, determine types of sounds within the audio. Accordingly, the audio analysis software 220 (implemented by the first electronic processor 205) receives data, including audio, from the cameras 105A through 105C and outputs information relating to the analyzed audio. For example, based on the received audio, the audio analysis software 220 may determine a gunshot, glass breaking, a break-in, or other noises present within the audio. The video analysis software 225 is implemented by the first electronic processor 205 to analyze images (for example, images 130 and/or video captured by the cameras 105A through 105C and stored in the database 125) to, among other things, identify and determine features (such as objects of interest) within the images.

In combination with the audio analysis software 220, the video analysis software 225 may capture images associated with an event occurrence and communicate with the first electronic processor 205 to associate the images and the audio of the event occurrence. When the audio analysis software 220 determines an event occurrence based on the received audio, such as glass breaking, the audio analysis software 220 transmits an indication of the event occurrence and the event type (e.g., the output of the audio analysis software 220) to the first electronic processor 205. The first electronic processor 205 may associate the glass breaking event with corresponding video of the glass breaking. Accordingly, an operator may access an event and its corresponding video and audio.

In some implementations, the audio analysis software 220 and the video analysis software 225 are machine-learning models pre-trained to identify particular features within provided data. Example machine learning techniques and include regression learning, classification learning, clustering analysis, density estimation, support vector machines, artificial neural networks, decision tree learning, and the like.

As noted above, the first communication interface 215 allows the first computer 115 to communicate with other devices connected to the communications network 110, such as the cameras 105A through 105C. The first electronic processor 205 is communicatively connected to the user interface 230. The first electronic processor 205 receives user inputs from the user interface 230 and may configure settings of devices connected to the communications network 110 based on the user inputs, as described below in more detail. It should be understood that the functionalities of the first computer 115 may be spread over multiple devices and need not solely be performed within the first computer 115.

Figure 3:
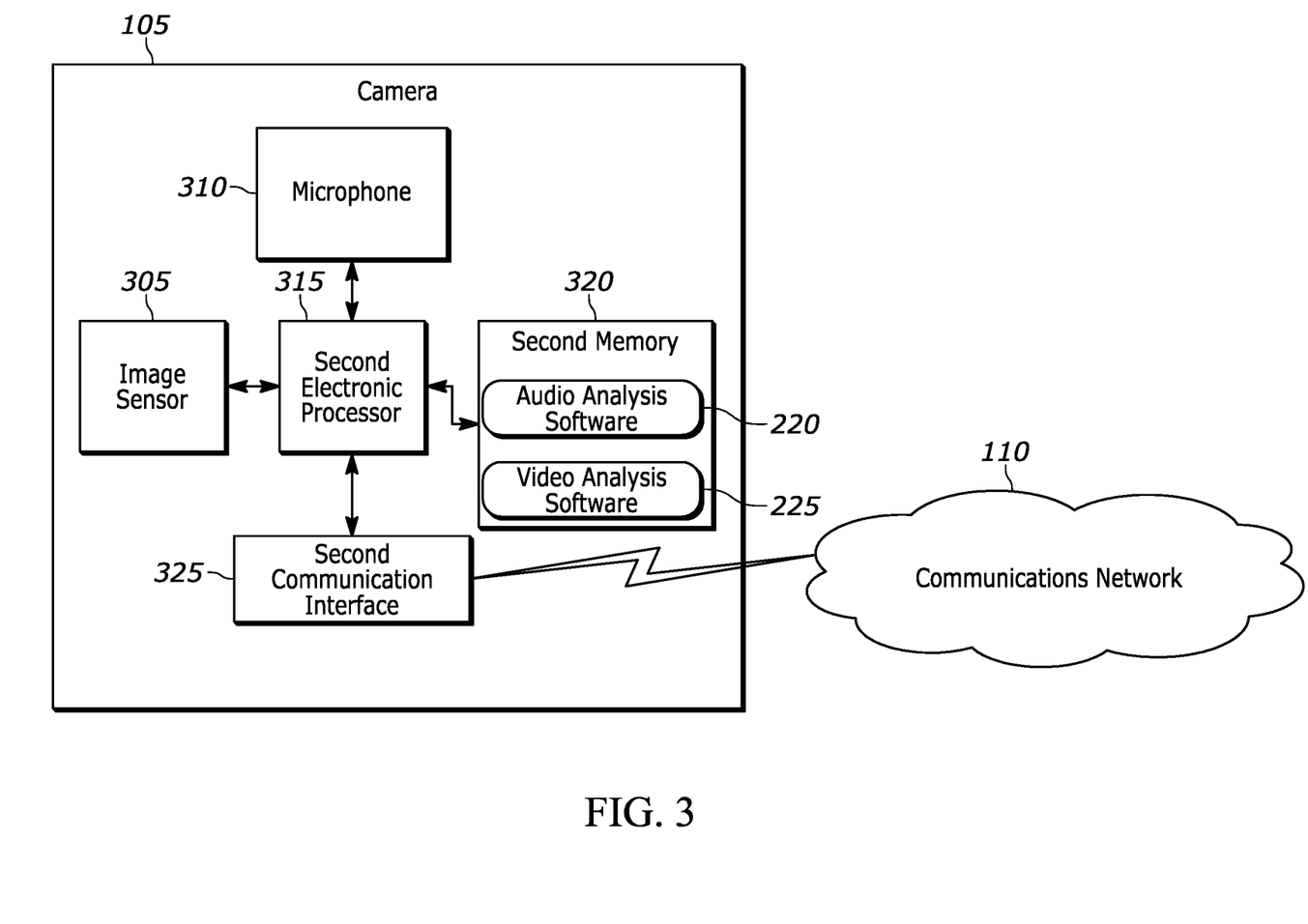
FIG. 3 is a block diagram of a camera of the analytics system of FIG. 1 according to one example.

FIG. 3 is a block diagram of an example camera 105. The camera 105 includes, among other things, an image sensor 305, a microphone 310, a second electronic processor 315, a second memory 320, and a second communication interface 325. The image sensor 305 is configured to capture image and/or videos of a viewpoint of the camera 105. In some examples, the image sensor 305 may be a lidar sensor, a radar sensor, or other sensor capable producing an image. The microphone 310 captures audio of the environment surrounding the camera 105, including the location monitored by the image sensor 305. In some situations, the microphone 310 is a micro electro-mechanical system ("MEMS") sensor. In some examples, the microphone 310 is located within an external device but communicatively connected to the camera 105.

The second electronic processor 315 is communicatively connected to the image sensor 305, the microphone, the second memory 320, and the second communication interface 325. It should be understood that the second electronic processor 315, the second memory 320, and the second communication interface 325 include similar components to those described above with respect to the first electronic processor 205, the first memory 210, and the first communication interface 215, respectively, and perform similar functions but need not be identical.

While the audio analysis software 220 and the video analysis software 225 are described with respect to the first computer 115, in some instances, the audio analysis software 220 and/or the video analysis software 225 are instead located within a camera 105. For example, the camera 105 may apply the video analysis software 225 to captured video and apply the audio analysis software 220 to captured audio. The camera 105 then transmits the results of the video analysis and the audio analysis to the first computer 115.

Figure 4:
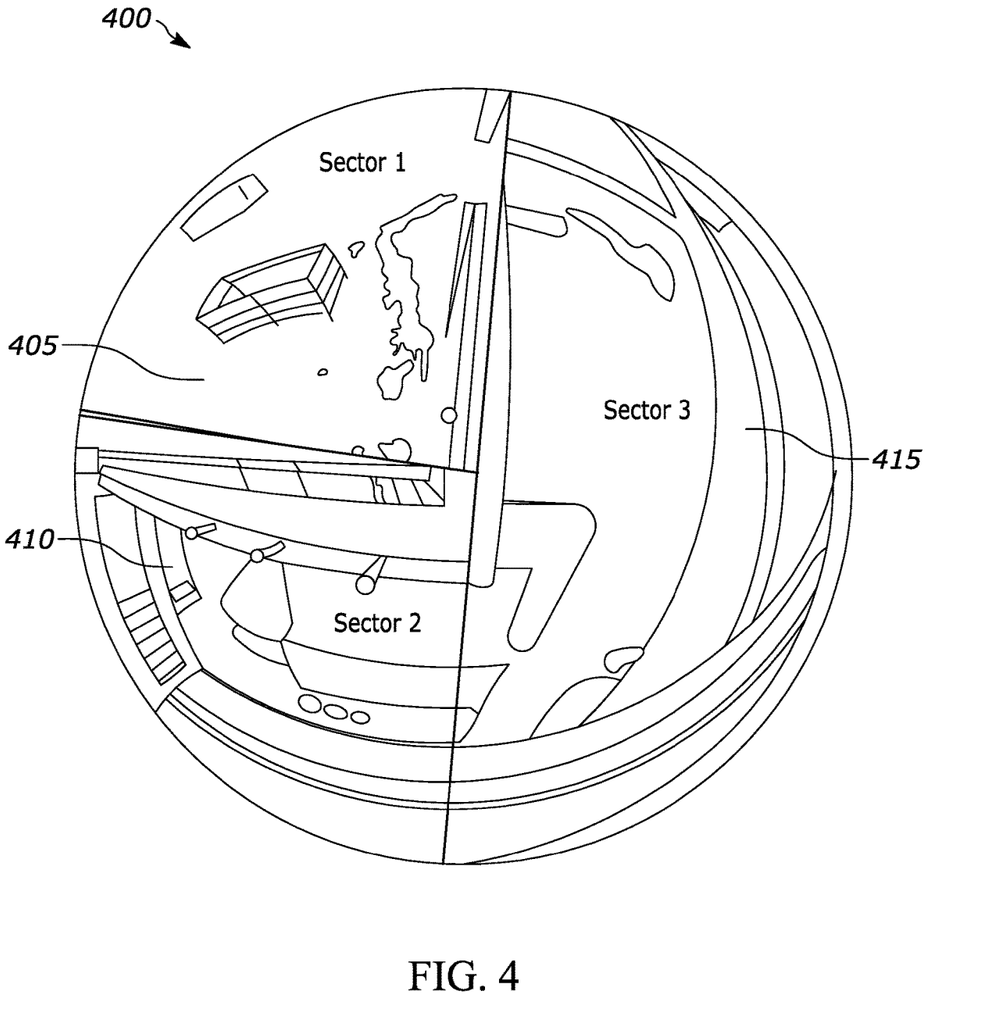
FIG. 4 illustrates a camera view including multiple audio sectors according to one example.

In the examples described herein, individual sectors within the view of a camera may be configured based on a user's preferences. FIG. 4 illustrates a camera view 400 captured by the camera 105. The camera 105 captures, with the image sensor 305, the camera view 400 of an environment visible by the camera 105 (e.g., a location, a viewpoint). In the example shown in FIG. 4, the camera view 400 includes a first sector 405, a second sector 410, and a third sector 415 that, when combined, provide a 360 degree view surrounding the camera 105. In the example provided, the first sector 405 provides a 90 degree view, the second sector 410 provides a 90 degree view, and the third sector 415 provides a 180 degree view. Accordingly, it is not necessary that the set angles of the first sector 405, the second sector 410, and the third sector 415 be identical. In some implementations, the camera view 400 includes more or fewer sectors than the number shown in FIG. 4. For example, two or four sectors may be provided. The camera 105 transmits the camera view 400, via the communications network 110, to the first computer 115.

In some instances, the camera 105 is in a fixed position to face a particular location. In other instances, the camera 105 is movable such that the camera 105 may view multiple locations. For example, a range of positions of a motor moving the camera 105 may define a sector. The first electronic processor 205 may determine which sector (or sectors) is being viewed based on the position of the motor.

Figure 5:
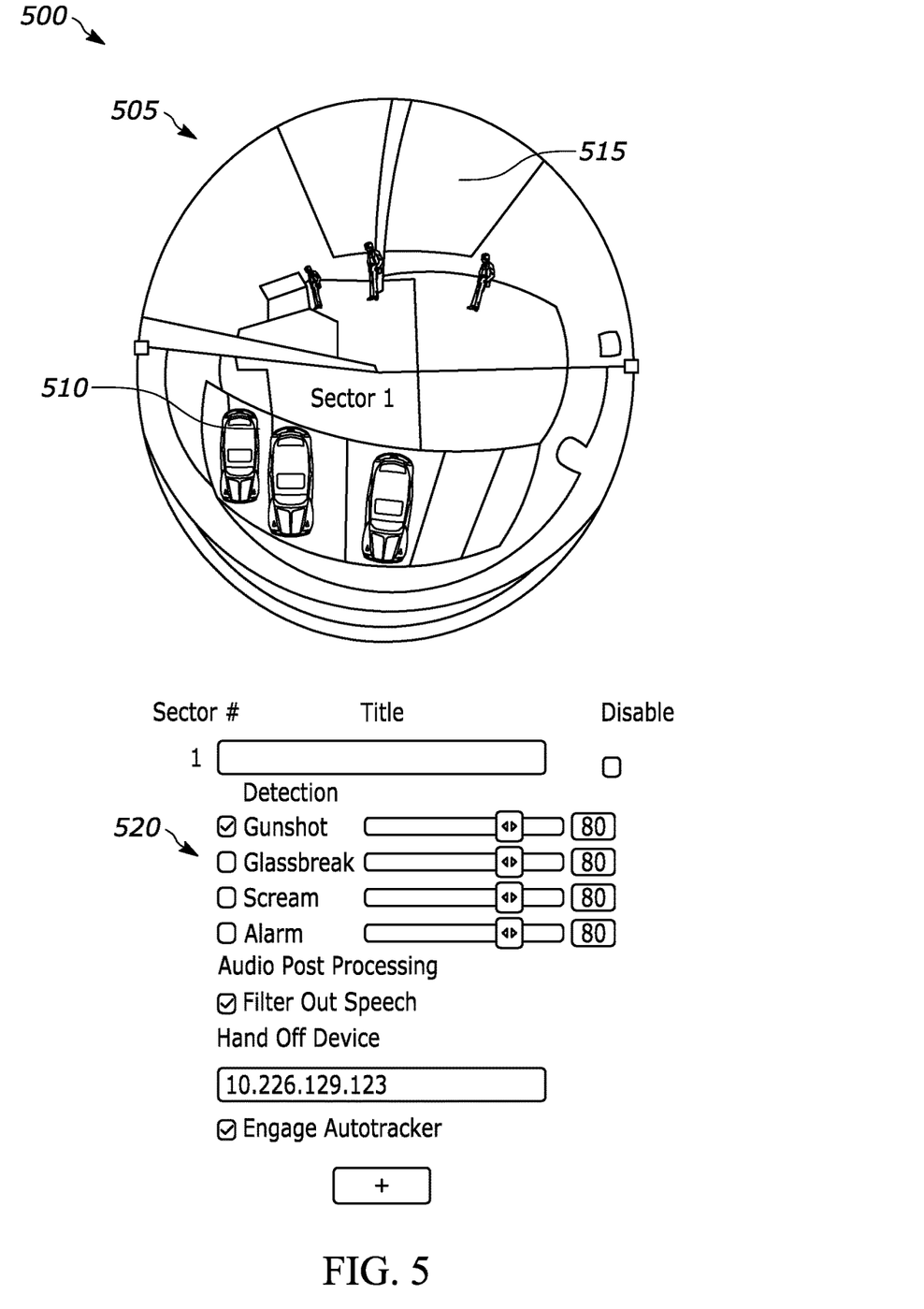
FIG. 5 illustrates a graphical user interface showing configurable audio sectors according to one example.

The sectors of FIG. 4 may be set using a graphical user interface. For example, FIG. 5 illustrates a graphical user interface 500 provided on the user interface 230 of the first computer 115. The graphical user interface 500 includes a camera view 505, a first sector 510, a second sector 515, and a plurality of interactive graphical elements 520. The graphical user interface 500 allows for the individual configuration of each sector of the camera view 505 via the plurality of interactive graphical elements 520. For example, the plurality of interactive graphical elements 520 includes radio buttons, check boxes, slider bars, and other elements that allow a user to alter settings of the sectors in the camera view 505. In examples described herein, the first electronic processor 205 receives inputs to the graphical user interface 500. Settings updated via the graphical user interface 500 are then provided to the second electronic processor 315 of the camera 105 via the communications network 110.

In the example of FIG. 5, the first sector 510 is selected for setting configuration. The plurality of interactive graphical elements 520 include enabling the detection of particular sounds, such as gunshots, glass breaking, screams, and an alarm via respective radio buttons. Slider bars are provided to adjust a sensitivity of detected sounds. In some implementations, the sensitivity indicates a sound threshold (for example, in decibels) that the sound should exceed for the second electronic processor to detect the sound event. In another implementation, the sensitivity indicates a confidence of the audio analysis software. When the confidence exceeds the set sensitivity value, the second electronic processor 315 detects the sound event. While not explicitly illustrated, the graphical user interface 500 may include additional interactive graphical elements 520. For example, interactive graphical elements 520 may be provided for setting a size of each sector, setting priority values of the sectors, and scheduling configuration changes of the sectors, as described herein.

In some examples, configuring the sensitivity of each sector includes configuring the sensitivity of the microphone 310 (in decibels). For example, based on a user input via the plurality of interactive graphical elements 520, the first electronic processor 205 configures the sensitivity of the microphone 310 detecting sound from the first sector 510. In response to another user input via the plurality of interactive graphical elements 520, the first electronic processor configures the sensitivity of the microphone 310 detecting sound from the second sector 515.

In other examples, the first electronic processor 205 configures the sensitivity of the audio analysis software 220 to particular sounds. For example, in response to a user input via the plurality of interactive graphical elements 520, the first electronic processor 205 configures a confidence threshold of the audio analysis software 220 to detect the sound of a gunshot, the sound of glass breaking, the sound of an alarm, or the like. The sensitivity of each sound type may be set for each sector individually.

In some instances, the first electronic processor 205 sets, based on inputs to the graphical user interface 500, a priority value of the sectors of the camera view 400. The priority value may be set based on a scale (e.g., a priority value on a scale of 0 through 10, a percentage between 0 and 100, or the like). The priority values indicate which sector should be prioritized given two simultaneous events in two different sectors. For example, if multiple events are detected in rapid succession from different sectors, the event from a higher priority sector will not be interrupted if it includes a "reaction" to the event (such as steering the camera, tracking a feature, or the like). An event in a lower priority sector may be interrupted by an event in a higher priority sector. Additionally, in some implementations, event types are also given priority values in addition to or in replacement of priority values for the sectors.

As one example with respect to FIG. 5, the priority value of the first sector 510 is set to be greater than the priority value of the second sector 515. In such an instance, the first sector 510 is deemed to be a greater priority than the second sector 515. A first event occurrence located in the first sector 510 will not be interrupted by a second event occurrence located in the second sector 515. In some instances, the first electronic processor 205 generates a notification identifying the first event occurrence on the graphical user interface 500, but does not provide a notification identifying the second event occurrence.

Additionally, in response to detected events, the camera 105 (or other devices within the analytics system 100) may be controlled to perform an action. For example, the camera 105 may trigger an alarm, steer the camera 105 to the location of the detected event (i.e., if the camera 105 is a pan/tilt/zoom ("PTZ") camera), or activate motion tracking in response to a detected event. A command indicating the action may be generated by the first computer 115 in response to the detected event, or may be generated and performed by the camera 105 itself in response to the detected event. Should the action be associated with a high-priority event or sector, the action is not interrupted given the detection of a second, lower-priority event.

In some examples, the first electronic processor 205 sets a size of each sector of the camera view 400. For example, in response to a first user input via the plurality of interactive graphical elements 520, the first electronic processor 205 sets a size of the first sector 510 within the camera view 400 as a portion of the 360 degree view. In response to a second user input via the plurality of interactive graphical elements 520, the first electronic processor 205 sets a size of the second sector 515 within the camera view 400 as a portion of the 360 degree view. In some examples, the size of each sector corresponds to a position of the camera 105. For example, as previously described, the position of a motor used to actuate the camera 105 may be monitored to determine the location of the camera 105, and therefore the viewpoint of the camera 105. Sectors may be added or removed based on a user input via the plurality of interactive graphical elements 520.

In some examples, the first electronic processor 205 adjusts the configuration of each sector of the camera view 400 based on a time of day. For example, a user sets, via the plurality of interactive graphical elements 520, a time at which a configuration for a sector of the camera view 400 changes. At the set time, the first electronic processor 205 may alter a size of a sector, alter a priority of a sector or event, or the like. As one example, if the first sector 510 experiences a high level of noise at a particular time of day, the first electronic processor 205 decreases the sensitivity of the microphone 310 at that time of day. In another example, if the field of view of the second sector 515 includes a shooting range and gunshots are expected in the afternoon, the first electronic processor 205 decreases the sensitivity of the audio analysis software 220 detecting sound from the second sector 515 or decreases the sensitivity of the audio analysis software 220 to the sound of a gunshot. In another example, the first electronic processor 205 may disable the sensitivity to the sound of a gunshot for each sector of the camera view 400 during the Fourth of July such that an event occurrence will not be detected based on any nearby fireworks. Accordingly, the sector configurations may be dynamic based on times set by a user.

Figure 6:
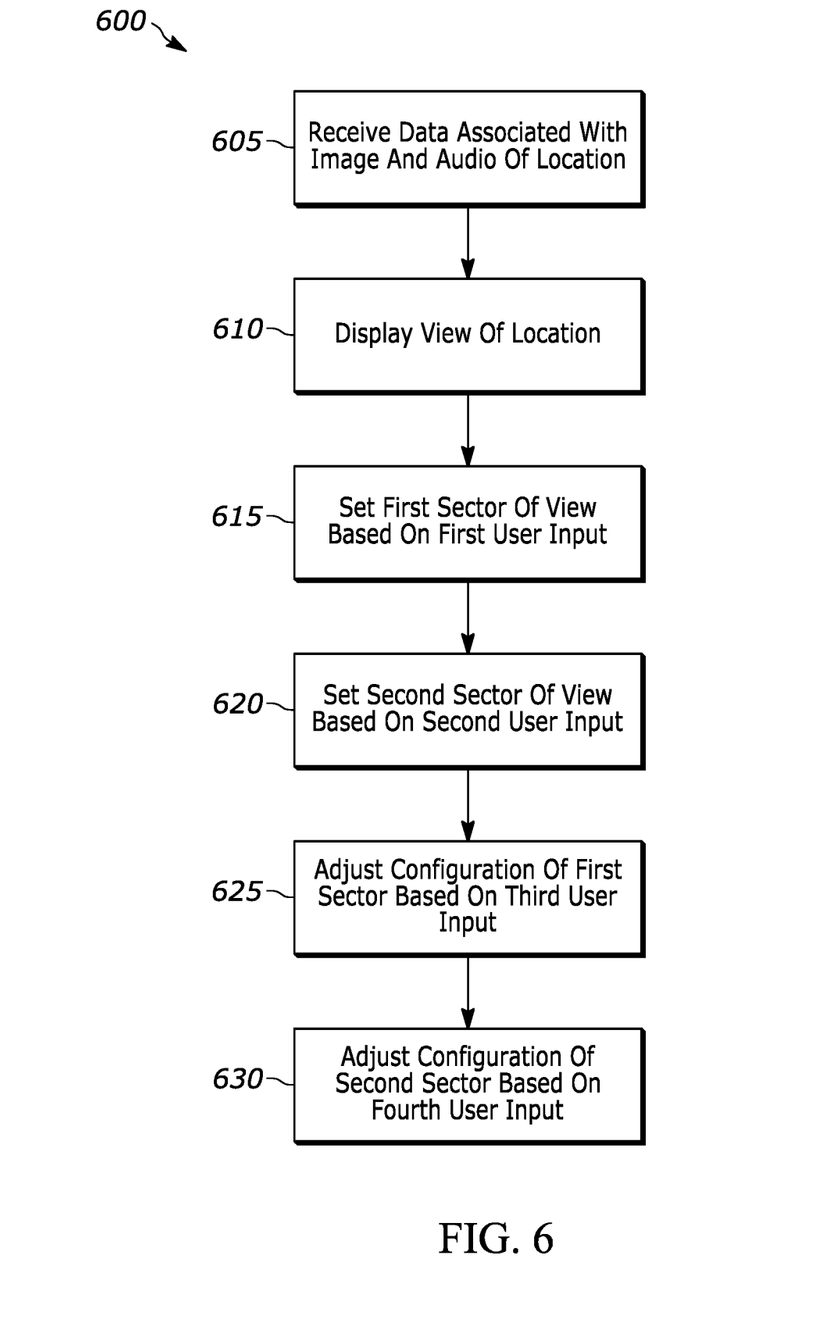
FIG. 6 illustrates a flow chart of a method for configuring audio sectors of a camera according to one example.

FIG. 6 illustrates an example flowchart of method 600 for configuring the sectors of the camera view 400. The method 600 is described as being executed by the first electronic processor 205. However, in some examples, aspects of the method 600 are performed by another device. For example, the method 600 may be performed by the second electronic processor 315 of a camera 105 or the first electronic processor 205 in conjunction with the second electronic processor 315 of a camera 105. Additionally, while a particular order is provided, in some examples, the steps of the method 600 may be performed in a different order.

At step 605, the first electronic processor 205 receives data including an image of a location and an audio of the location. For example, the first electronic processor 205 receives the camera view 505 and audio associated with the camera view 505 from the camera 105. At step 610, the first electronic processor 205 displays the image of the location. For example, as shown in FIG. 5, the camera view 505 is displayed via the graphical user interface 500.

At step 615, the first electronic processor 205 sets a first sector of view based on a first user input. For example, the first electronic processor 205 receives a first user input via the graphical user interface 500 indicative of an area of the first sector 510. The first user input may, for example, indicate a portion of the 360 degree view of the camera 105.

At step 620, the first electronic processor 205 sets a second sector of view based on a second user input. For example, the first electronic processor 205 receives a second user input via the graphical user interface 500 indicative of an area of the second sector 515. The second user input may, for example, indicate a portion of the 360 degree view of the camera 105 that is not part of the first sector 510. In some instances, the second sector 515 is set as a remaining portion of the 360 degree view of the camera 105.

At step 625, the first electronic processor 205 adjusts a configuration of the first sector based on a third user input. For example, the first electronic processor 205 may set a priority value of the first sector 510, a size of the first sector 510, a sensitivity of the first sector 510, or any command associated with the field of view of the camera view 505 to the first sector 510, as previously described. At step 630, the first electronic processor 205 adjusts a configuration of the second sector based on a fourth user input. For example, the first electronic processor 205 may set a priority value of the second sector 515, a size of the second sector 515, a sensitivity of the second sector 515, or any command associated with the field of view of the camera view 505 to the second sector 515, as previously described.

It should be understood, that in other examples, the method 600 may continue to set and configure additional sectors of the camera view when the first electronic processor 205 receives additional user inputs. The method 600 may continue to set and configure as many additional sectors based on additional user inputs.

Figure 7:
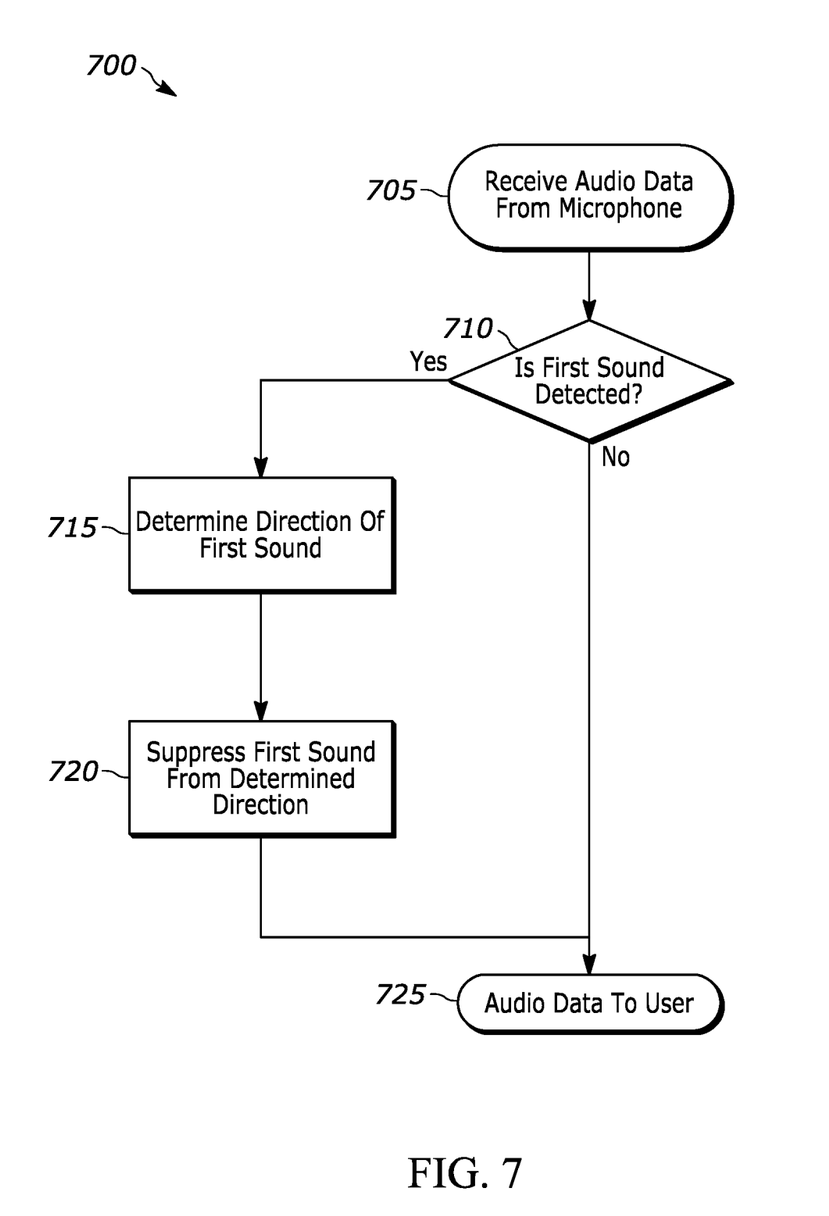
FIG. 7 illustrates a flow chart of a method for suppressing audio associated with a sector according to one example.

In some implementations, prior to providing audio via an output device, the first electronic processor 205 suppresses audio that may be sensitive or confidential. FIG. 7 illustrates an example flowchart of method 700 for suppressing audio associated with the sectors of a camera view. It should be understood that the method 700 may be performed in conjunction with the method 600 as described above. Additionally, the method 700 is described as being executed by the first electronic processor 205. However, in some examples, aspects of the method 700 are performed by another device. For example, the method 700 may be performed by the second electronic processor 315 of a camera 105 or the first electronic processor 205 in conjunction with the second electronic processor 315 of a camera 105. Additionally, while a particular order is provided, in some examples, the steps of the method 700 may be performed in a different order.

At step 705, the first electronic processor 205 receives audio from a microphone. For example, audio captured by the microphone 310 is transmitted from the camera 105 to the first computer 115. At step 710, the first electronic processor 205 determines whether a first sound is detected in the audio. For example, the first electronic processor 205 determines whether speech is present within the audio by implementing the audio analysis software 220. For example, the first electronic processor 205 implements the audio analysis software 220 stored in the first memory 210 to determine whether a first sound is present within the audio. The first sound may include words, phrases, vocal frequency, or a vocal pitch. When the first electronic processor 205 determines that the first sound is present in the audio, the first electronic processor 205 proceeds to step 715. When the first electronic processor 205 determines that the first sound is not present in the audio, the first electronic processor 205 proceeds to step 725.

At step 715, the first electronic processor 205 determines the direction of the first sound. For example, the first electronic processor 205 may determine the direction of the first sound relative to the direction that the camera 105 is facing and transmit a command to the camera 105 to move the camera 105. The camera 105 then moves to face the direction in which the first sound is detected. In other examples, the first electronic processor 205 may determine the direction of the first sound relative to a sector of the camera view 400. In such an example, the direction of the first sound is determined to be within at least one of the sectors (e.g., the first sector 405) of the camera view 400.

The first electronic processor 205 then transmits a command to the camera 105 to track motion within the camera viewpoint corresponding to the direction of the first sound. At step 720, the first electronic processor 205 suppresses the first sound from the determined direction. For example, the first electronic processor 205 distorts the frequencies associated with the first sound or adds noise to the first sound to suppress the first sound. In some embodiments, the first electronic processor 205 selects and applies a filter to the first sound based on a configuration of the sector associated with the first sound.

At step 725, the first electronic processor 205 provides the audio to a user. For example, the first electronic processor 205 provides the audio via a speaker. In instances where the first sound is suppressed, the provided audio does not include the first sound, or includes a distorted version of the first sound.

Thus, examples provide, among other things, a system and method for configuring audio sectors of a camera. Various features, advantages, and examples are set forth in the following claims.

What is claimed is:

1. An audio analytics system, the system comprising:
a first computer configured to receive information from a camera and a microphone, the first computer including an electronic processor configured to:
receive data including an image of a location and an audio of the location;
generate a view of the location based on the received data;
set, in response to receiving a first user input, a first sector of the view of the location;
set, in response to receiving a second user input, a second sector of the view of the location;
set, in response to receiving a third user input, a priority value of the first sector;
set, in response to receiving a fourth user input, a priority value of the second sector, wherein the priority value of the second sector is different than the priority value of the first sector;
detect a first event occurrence within the first sector based on data received from the microphone;
detect a second event occurrence within the second sector based on data received from the microphone; and
generate a view of the first sector based on the priority value of the first sector and the first event occurrence.

2. The audio analytics system of claim 1, wherein the electronic processor is further configured to:
disregard the second event occurrence based on the priority value of the second sector.

3. The audio analytics system of 1, wherein the electronic processor is further configured to:
configure, in response to receiving a fifth user input, a sensitivity of the microphone detecting sound from the first sector; and
configure, in response to receiving a sixth user input, a sensitivity of the microphone detecting sound from the second sector, the sensitivity of the second sector different than the sensitivity of the first sector.

4. The audio analytics system of claim 1, wherein the electronic processor is further configured to:
set, in response to receiving the first user input, a size of the first sector within the view of the location; and set, in response to receiving the second user input, a size of the second sector within the view of the location, wherein the size of the second sector is different than the size of the first sector.

5. The audio analytics system of claim 1, wherein the electronic processor is further configured to:
   adjust a configuration of the first sector in response to a first time being satisfied; and
   adjust a configuration of the second sector in response to a second time being satisfied.

6. The audio analytics system of claim 5, wherein the first time is different from the second time.

7. The audio analytics system of claim 1, wherein the electronic processor is further configured to:
   detect a first sound associated with the first sector via the microphone; and
   in response to detecting the first sound, control the performance of an action with the camera,
   wherein the action is one selected from the group consisting of triggering an alarm, steering the camera to a location of the first sound, and activating motion tracking.

8. The audio analytics system of claim 1, wherein the electronic processor is further configured to:
   detect a first sound associated with the first sector via the microphone; and
   suppress, based on the configuration of the first sector, the first sound.

9. A method for controlling an audio analytics system, the method comprising:
   receiving, via an electronic processor, data including an image of a location from a camera and an audio of the location from a microphone;
   generating, via the electronic processor and on a display, a view of the location based on the received data;
   setting, via the electronic processor and in response to receiving a first user input, a first sector of the view of the location;
   setting, via the electronic processor and in response to receiving a second user input, a second sector of the view of the location;
   setting, via the electronic processor and in response to receiving a third user input, a priority value of the first sector;
   setting, via the electronic processor and in response to receiving a fourth user input, a priority value of the second sector, wherein the priority value of the second sector is different than the priority value of the first sector;
   detecting, via the electronic processor, a first event occurrence within the first sector based on data received from the microphone;
   detecting, via the electronic processor, a second event occurrence within the second sector based on data received from the microphone; and
   generating, via the electronic processor, a view of the first sector based on the priority value of the first sector and the first event occurrence.

10. The method of claim 9, further comprising:
    disregarding, via the electronic processor, the second event occurrence based on the priority value of the second sector.

11. The method of claim 9, further comprising:
    configuring, via the electronic processor and in response to receiving a fifth user input, a sensitivity of the microphone detecting sound from the first sector; and
    configuring, via the electronic processor and in response to receiving a sixth user input, a sensitivity of the microphone detecting sound from the second sector, the sensitivity of the second sector different than the sensitivity of the first sector.

12. The method of claim 9, further comprising:
    setting, via the electronic processor and in response to receiving the first user input, a size of the first sector within the view of the location; and
    setting, via the electronic processor and in response to receiving the second user input, a size of the second sector within the view of the location, wherein the size of the second sector is different than the size of the first sector.

13. The method of claim 9, further comprising:
    adjusting, via the electronic processor, a configuration of the first sector in response to a first time being satisfied; and
    adjusting, via the electronic processor, a configuration of the second sector in response to a second time being satisfied.

14. The method of claim 13, wherein the first time is different than the second time.

15. The method of claim 9, further comprising:
    detecting, via the electronic processor, a first sound associated with the first sector via the microphone; and
    controlling, via the electronic processor, in response to detecting the first sound, the performance of an action with the camera,
    wherein the action is one selected from the group consisting of triggering an alarm, steering the camera to a location of the first sound, and activating motion tracking.

16. The method of claim 9, further comprising:
    detecting, via the electronic processor, a first sound associated with the first sector via the microphone; and
    suppress, via the electronic processor and based on the configuration of the first sector, the first sound.

* * * * *